Jan. 15, 1929.
A. PFAU, JR
1,699,405
ELECTRICAL HEATING APPLIANCE
Filed July 24, 1926
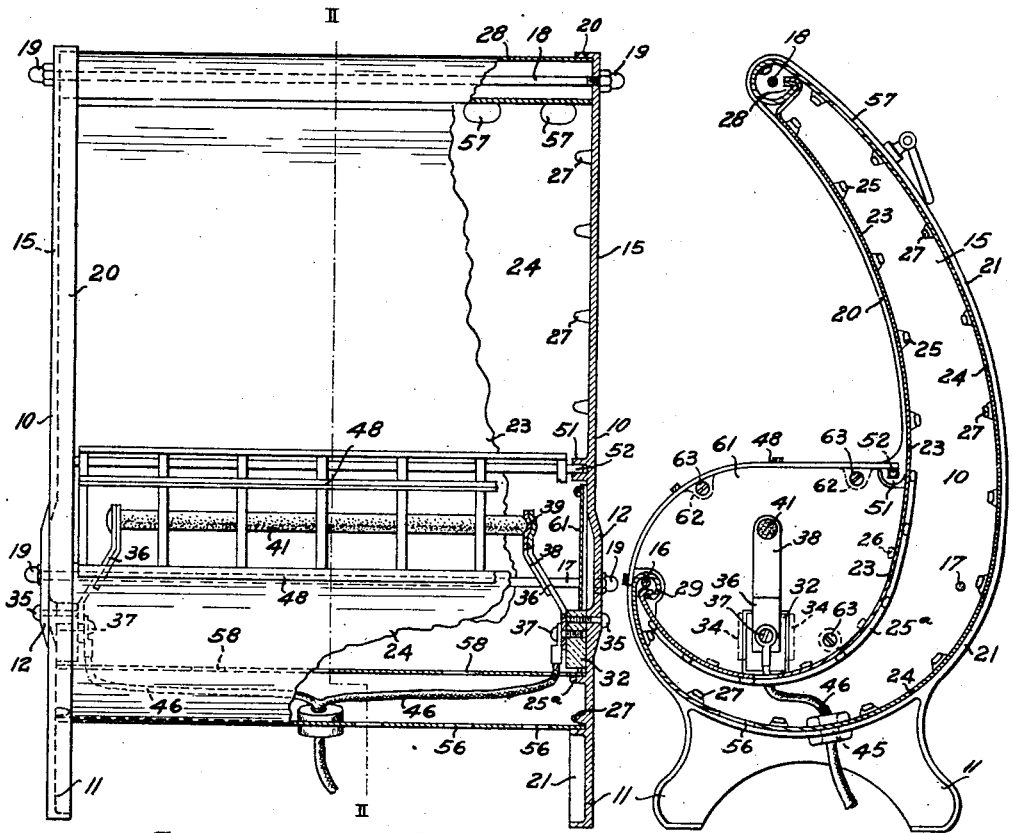
Fig. 1
Fig. 2
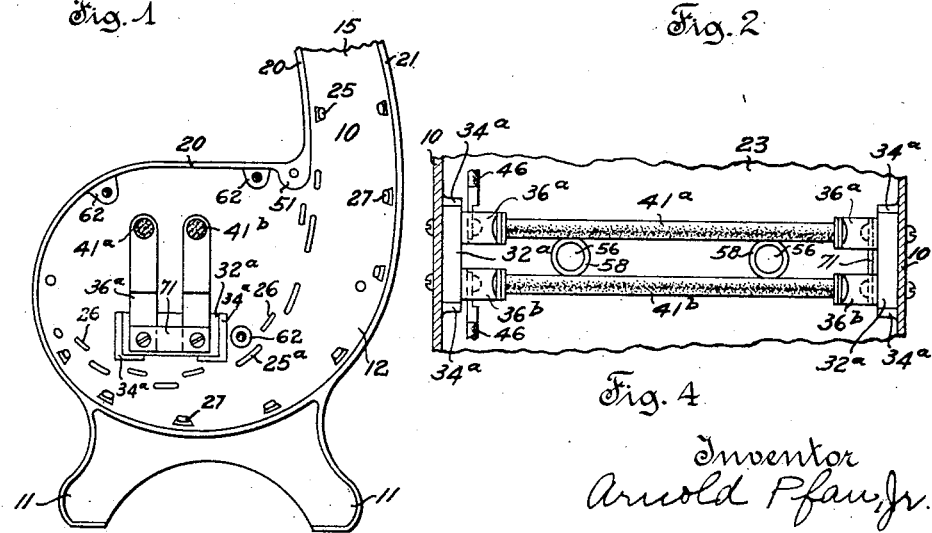
Fig. 3
Fig. 4
Inventor
Arnold Pfau, Jr.
by John J. Kane
Attorney Patented Jan. 15, 1929.

1,699,405

UNITED STATES PATENT OFFICE.

ARNOLD PFAU, JR., OF SAN FRANCISCO, CALIFORNIA, ASSIGNOR TO GLOBAR CORPORATION, OF NIAGARA FALLS, NEW YORK, A CORPORATION OF NEW YORK.

ELECTRICAL HEATING APPLIANCE.

Application filed July 24, 1926. Serial No. 124,701.

This invention relates in general to electrical heating appliances, and it has more particular relation to electrical heating appliances of the radiant reflector type.

It is an object of the present invention to provide an electrical heating appliance, and more particularly a radiant reflector heater, of improved character and design which is of simple and inexpensive construction and extremely durable and efficient in operation.

It is a further object of the present invention to provide a radiant reflector heater of improved design and construction embodying reflector and housing elements of such design and so disposed relative to the heating element as to insure facility of assembly of parts and the production of desirable heating effects in operation, through both radiation and convection, and a desirable degree of insurance against overheating of surrounding objects.

It is a further object of the present invention to provide an improved form of electrical heating appliance of the character described an embodying a heating unit and an improved form of mounting therefor which facilitates ready removal of the heating element from and its replacement in the appliance, and which contributes to the simplicity of construction and assembly and the efficient operation and extended useful life of the heating appliance.

These and other objects and advantages are attained by the present invention, various novel features of which will be apparent from the accompanying description and drawings, disclosing an embodiment of the invention, and will be more particularly pointed out in the claims.

In the drawings:

Fig. 1 is a view in front elevation, with parts broken away, of a heating appliance embodying features of the present invention.

Fig. 2 is a section in the plane of the line II—II of Fig. 1.

Fig. 3 is a view in side elevation of a detail of a slightly modified form of the heating appliance shown in Figs. 1 and 2.

Fig. 4 is a plan view of a detail of the apparatus shown in Fig. 3.

In accordance with the disclosure of the drawings, a heating appliance includes a pair of spaced side or end frames or pieces 10 which are relatively rigid and self-supporting, being preferably provided with supporting feet 11 disposed along the lower side thereof adjacent the front and rear edges of the side frames. Each side frame includes a body portion 12 from which the supporting feet 11 project, these supporting feet being of any relative size and spacing desired, and an upper extension of reduced width tapering upwardly and curving forwardly along any suitable curvature, depending upon the desired curvature of the reflecting element of the heating appliance.

The side frames 10 may be held in desired spaced relation by spacing or tying rods or bolts 16, 17, 18, the rod 16 being disposed at the lower forward edge of the frames, the rod 17, at a lower rear edge of the frames, and the rod 18 at the upper forwardly projecting extremity of the upper extension 15 of the frames.

Each of the side frames 10 is provided along its periphery at the inner side thereof with an inwardly extending and substantially continuous flange or bead, indicated at 20 at the forwardly presented edge of the side frame, and at 21 at the rear and lower edges of the side frame.

A reflector element 23 and a rear or outer enclosing wall therefor 24 are mounted upon and between the two spaced side frames 10. The side edges of the front wall or reflector element 23, which is preferably of polished sheet metal and of desired curvature of reflecting surface is arranged to lie behind and along the inner face of the front flange or bead 20 associated with the vertical extensions 15 of the side frames and to lie between and be positioned by said flange and a suitable continuous projection or series of projections disposed at the inner faces of the side frames, and indicated at 25 as extending substantially to the front edge of the body portion 12 of each side frame, the upper part of this series of projections being indicated as being made up of spaced projections and the lower part of a substantially continuous flange 25ª provided with spaced projections. Spaced forwardly and upwardly of the projections 25 and 25ª on the body portion 12 of each side frame and in substantial prolongation of the portion of flange 20 on the upper extension 15 is a continuous flange or series of projections 26, the side edges of the lower curved portion of the reflector being positioned between the two series of projections 25ª and 26.

The curvature of the reflecting face of the reflector element 23 may be anything desired, parabolic, hyperbolic, elliptical, etc.; but the drawings may be considered as showing a curvature which is of slightly hyperbolic formation so as to insure projection of the reflected heat rays in the desired direction with some degree of dispersion.

The rear wall 24 is likewise preferably of sheet metal and is held in close association with the inner face of the flange or bead 21 along the rear and bottom edge of the two side frames 10, being maintained in position between the flange 21 and a series of projections 27 extending parallel to and slightly spaced inwardly from the flange 21 throughout the length of the latter. This rear wall 24 is preferably of substantially the same curvature as the front reflecting wall 23, being, however, more widely spaced from the latter at intermediate points and with the space between the two walls gradually tapering in width toward the upper and lower forward edges, as indicated.

The reflector 23 and the rear wall 24 may be secured together in assembled relation by interlocking a bent or hook-shaped portion at the upper edge of the front wall 23, with a tubular shaped formation of the upper edge of the rear wall 24, the two walls together at this point forming a substantially closed tube, with portions of each wall bracing the other, as indicated at 28. The two walls may be permanently secured together at their upper edges in the shape indicated or they may be releasably interlocked in position. The lower forward and upwardly projecting edge portions of the front and rear walls 23, 24 may be brought and held together, a preferable arrangement being that indicated at 29, wherein the forward edge of the wall 24 is rolled backwardly to form a tubular portion with a forwardly extending edge which fits into a rearwardly turned hook formed in the forward edge of the reflector element 23. The parts 23 and 24 may be permanently or releasably secured together at their forward edges in the positions indicated. The space within the interlocked upper edges of the parts 23 and 24, indicated at 28, is adapted to receive the securing rod 18, and the space within the interlocked forward edges of these parts is adapted to receive the securing rod 16.

The side frames 10 may be held in desired spaced apart relation by nuts or projections on the rods 16, 17, 18, against the inner face of the side frames, the terminal cap nuts 19 on such rods bearing against the outer side of the side frames and serving to prevent separation of such side frames and the assembled reflector 23 and rear wall 24; or the latter members 23 and 24, through the cooperation of their side edges with the inner faces of the side frames, may be relied upon to hold the latter in the desired spaced apart relation when the parts are assembled and secured in such condition by the securing nuts 19 on the rods 16, 17, 18. The positioning of the securing rods 16, 17, 18 within the confines of the walls 23 and 24, as indicated, serves to effectively conceal these rods, a feature which contributes to the appearance of the assembled heater.

Mounted at the inner side of the body portion 12 of each of the side frames 10 is a block of insulating material 32, held in position on a seat between a pair of spaced positioning flanges or ribs 34, by one or more screws or bolts 35 passing through the body portion of the frame, the adjacent edge portions of the reflector 23 being slotted to any required extent to permit easy passage of this insulating block 32 and the contacts and terminal connections associated therewith. A contact element 36 is mounted upon the insulating block 34 at the inner side thereof, being secured in position by one or more screws or bolts 37. This contact element 36 is shown as extending upwardly from the support 32 and having its upper end slightly bowed or offset away from the support, as indicated; and the contact element is of resilient conductive material, preferably suitably resistant to high temperatures, such as steel or an iron-chromium or iron-chromium nickel-alloy, such as ascoloy. This resilient portion of the contact element has mounted thereon a contact strip 38 of relatively softer and more highly conductive material, such as aluminum or an aluminum-nickel alloy, such as alumel. The terminal portions of each contact element 36 and contact strip 38, or at least each contact strip, is provided with a shallow contact recess, indicated at 39.

A self-sustaining heating element 41, preferably in the form of a molded and heat-hardened composition product containing silicon carbide and having its terminal portions of increased conductivity, is disposed between the contact terminals 36 with the ends of the heating element in butt-end engagement with the walls of the recessed contact portion 39. With the heating element 41 disposed in such butt-end engagement with the contact portions of the contact elements 36, and the latter of suitable and desired yielding and resilient character, and biased toward each other, the contact elements engage the terminal ends of the heating element with sufficient force to efficiently maintain the heating element mechanically supported in desired operative position and to insure a desirable and efficient electrical engagement between the contacts and the terminals of the heating element.

The contact elements are preferably so mounted that the contact portions thereof and, consequently, the heating element supported therebetween, are disposed substantially at the focus of the curve of at least the major portion of the exposed or active reflecting wall 23, thus insuring reflection of heat rays emanating from the heating element in the desired direction or directions, that is, to form a parallel beam in the case of a parabolic reflector, a divergent beam in the case of a hyperbolic reflector, and convergent beam in the case of an elliptical reflector.

The preferable arrangement as to the shape of the reflector wall 23 is along a single curvature, parabolic, hyperbolic, or elliptical, about a focus substantially coincident with the longitudinal axis of the heating element, to a point substantially beneath the heating element; and from this latter point, the wall of the reflector element is carried forwardly or upwardly as a plane surface or along any suitable curvature to a point somewhat below the heating element, but to a sufficient height to act as a shield or barrier preventing the direct radiation of the heating element from striking the floor or other support at too short a distance from the heating element. A desirable arrangement is one wherein the true curvature of main portion of the reflector wall extends forwardly to the point from which reflected heat rays just clear the upper edge of the barrier or shield formed by the forward and upwardly turned portions of the walls 23 and 24. A considerable portion of the rays striking this forward and upwardly turned portion of the reflector are reflected back on the body portion of reflector and thence reflected forwardly and upwardly into the room.

With the upwardly projecting forward edge portions of the reflecting wall 23 and the rear wall or housing 25 terminating at a point below the heating element 41, as indicated, the latter is exposed in its full brilliancy to view from the front of the heater; and this latter feature, combined with the fact that a very large portion of the reflector element is exposed to view from the sides, for the reason that the upwardly extending portions 15 of the side frames do not afford any concealment of the reflector, causes the heater when in operation to present a very pleasing effect upon the eye.

The rear wall 25 is apertured at a convenient intermediate point adjacent the points of support of the insulating blocks 32, as indicated at 45, the aperture being preferably provided with a tubular insulator, flexible insulating conductors 46 passing through the aperture 45 and through the space between the reflecting wall 23 and the rear wall 24, whence they pass through the slots in the edges of the reflector member and are connected to the contact elements 36 by means of the securing screws 37. However, the flexible insulated conductors 46 may be connected to contact elements of an insulating plug or connector having one part thereof suitably mounted in the rear wall 24 or the body portion of one of the side frames 10, current being furnished to the appliance through a flexible connection having a terminal plug adapted for cooperative association with such terminal contact elements fixed in the rear wall or the side frame.

A relatively stiff protective grille or open frame 48 may be provided as a desirable form of protection for the heating element 42 and its live contacts 38, thus insuring against accidental breakage of the heating element or accidents due to contact with live or heated parts of the apparatus. This grille or frame 48 is preferably bent or curved to a shape corresponding to the cooperative upper edges of the body portion 12 of the side frames. The lower or forward edge of the grille 48 is intended to rest on the rolled over lower or forward edge portion, at 29, of the rear wall 24; and the side frames 10 are provided on their inner faces, preferably beneath the flange 20, with slotted projections 51, projecting trunnion portions 52 on the rear edge of the grille being removably disposed within the recesses of the raised portions 51. The trunnion portion 52 on the rear edge of the grille may be readily inserted beneath the flanges 20 on the side frames 10 and into the slots of the portion 51, and when these portions are so disposed, the grille may be swung from normal position, indicated in the drawings, about the trunnions 52 as a pivot to such position as will readily permit the removal and replacement of the heating element 41. Because of the fact that the upper part of the grille is approximately horizontal, it may readily serve as a support for a utensil or article to be heated.

During operation, the reflector wall or member may become quite hot; but due to the provision of the air space between the reflector wall 23 and the rear wall or housing 24, the latter does not become heated to such an extent as to be a source of danger to articles in contact with or adjacent this rear wall 24. The air space between the two walls may be in the form of a substantially dead air space or, preferably, it may be provided with suitable apertures at the bottom toward the front, as indicated at 56, formed in the rear housing 24, and, if desired, at the top along the upper forwardly projecting edge of this rear wall, as indicated at 57, or of the reflector member 23, or both elements 23 and 24. This arrangement permits and provides for the circulation of cool air entering, through the apertures 56, the chamber between the two walls 23, 24, this air passing upwardly between the walls and becoming heated through contact with the reflector wall 23 and passing upwardly and outwardly, through the apertures 57, in one or both of the parts 23, 24, in the form of a current of warm air which spreads throughout the room.

If desired, the reflecting wall 23 may also be provided with one or more openings 58 near the lowest portion of the element, that is, beneath the heating element 41, which will serve to admit air from the space between the walls 23, 24 and provide for the upward circulation of a current of air which becomes heated through contact with the heating element 41 and the front face of the reflector 23.

Depending upon the space to be heated by the heating appliance, the reflecting wall 23 and the corresponding supporting portions of the end frames 10 may be of any desired shape, and, by varying the relative heights of the front and rear supporting feet 11, the body portion of the reflecting element may be tilted forward or backward to project the heat radiated from the reflector more nearly downwardly or upwardly, respectively, as desired. A handle to facilitate portability may be attached to the rear wall 24 adjacent its upper edge.

In order that the inner face of the body portion 12 of the side frames 10 may present a finished appearance, polished plates 61 of material similar to the reflector element 23 may be secured in position so as to cover all otherwise exposed inner portions of the side frames, these plates 61 being recessed to fit around the insulating blocks 32 and being secured in place on raised portions or seats 62 formed on the side frames, by means of screws 63 passing through the plates and threaded into the raised seats 62.

In the modification shown in Figs. 3 and 4, two heating elements 41$^a$, 41$^b$, with corresponding contact elements 36$^a$ and 36$^b$, are disclosed. Two contact elements 36$^a$ and 36$^b$ are mounted on an insulating block 32$^a$ held in position on a seat on each side frame 10, being secured between positioning ribs 34$^a$, as generally indicated in Figs. 1 and 2. As indicated, the circuit is from one side of the supply line, through a contact element 36$^a$, heating element 41$^a$, contact element 36$^a$ on the other side frame, bridging element 71, connecting the latter contact element 36$^a$ to the adjacent contact element 36$^b$, and from the latter through heating element 41$^b$ and contact element 36$^b$ on the first side frame, to the other side of the supply line. The contact elements of the heater of Figs. 3 and 4 are preferably so positioned that the heating elements 41$^a$, 41$^b$ are symmetrically grouped about a focus of the main or body portion of the reflector element 23.

It will be apparent that the invention hereinabove described provides a very simple design which permits or facilitates ready and inexpensive manufacture and assembly, and likewise presents a very sturdy and pleasing appearance. Further, the design of the supporting and reflecting elements of the heater body and of the contact elements which, of themselves, insure satisfactory mechanical and electrical mounting of the heating element, provide for ready removal or replacement of heating elements and generally contribute to prolongation of the useful life of a heating appliance.

It should be understood that it is not desired that the invention claimed be limited to the exact details of design and construction shown and described herein, for obvious changes will be apparent to persons skilled in the art to which this invention relates.

It is claimed and desired to secure by Letters Patent:

1. In an electrical heating appliance, the combination of a reflecting member supported in operative position, an electrical resistance heating element mounted in front of a portion of said reflecting member, and a continually upwardly extending wall curving forwardly at its upper portion supported in the rear of said reflecting member and spaced therefrom, said reflecting member having a portion extending upwardly at its lower side in front of the body portion of said reflecting member and located forwardly of said heating element, said upwardly extending portion being so formed and disposed relative to said heating element that heat radiated from said heating element is reflected by said upwardly extending portion upon the body portion of said reflecting member.

2. In an electrical heating appliance, the combination of a reflecting member supported in operative position, an electrical resistance heating element mounted in front of a portion of said reflecting member, and a wall supported in the rear of said reflecting member and spaced therefrom, said reflecting member and said wall having portions extending upwardly at their lower side in front of the body portion of said reflecting member and said rear wall and forwardly of said heating element, the space between said reflecting member and said rear wall having openings to the surrounding air at points adjacent the upper and lower ends of said space, said forwardly and upwardly extending portion of said reflecting member being adapted to reflect upon the body portion of the latter heat radiated from said heating element.

3. In an electrical heating appliance, the combination of a reflecting member supported in operative position, an electrical resistance heating element, means for detachably mounting said heating element in front of the body portion of said reflecting member, and a wall supported in the rear of said reflecting member and spaced therefrom, said reflecting member and said wall having portions at their lower side spaced from each other and extending upwardly in front of the body portion of said reflecting member and said rear wall, said upwardly extending portion being adapted to reflect upon the body portion of said reflecting member heat radiated from said heating element, and the upper edge of the upwardly extending portion of one of said parts having a portion rolled over the upper edge of the corresponding portion of said other part.

4. In an electrical heating appliance, the combination of spaced and rigid supporting side frames, a reflecting member disposed in operative position between said side frames, an electrical resistance heating element, means for mounting said heating element in front of a portion of said reflecting member, a wall disposed in the rear of said reflecting element and spaced therefrom, and means associated with said side frames for mounting said reflecting member and said rear wall in operative position with parts thereof cooperative with said side frames, said side frames and said reflecting member and rear wall serving to form an air space open adjacent its lower and upper ends and extending continuously upward.

5. In an electrical heating appliance, the combination of spaced and rigid side frames, a heating element, means carried by said side frames for mounting said heating element in operative position, a reflecting member disposed in operative position between said side frames, a wall disposed in the rear of said reflecting member, said side frames having portions thereof cooperative with edge portions of said reflecting member and said rear wall to definitely position the latter, and means associated with said side frames for securing said reflecting member and said rear wall in operative position relative to said side frames and said heating element.

6. In an electrical radiant heater, the combination of spaced supporting side frames, a reflecting member disposed in operative position between said side frames, an electrical resistance heating element, means carried by said side frames for detachably mounting said heating element in front of a portion of said reflecting member, and means associated with said side frames for detachably securing said reflecting member in operative position between said side frames.

7. In an electric radiant heater, the combination of a pair of spaced supporting side frames, a reflecting member, a heating element mounted in operative position relative to said reflecting member, a wall disposed in the rear of said reflecting member and spaced therefrom, said reflecting member and said wall having portions at their lower side extending upwardly to an appreciable extent, said upwardly extending portion of said reflecting member being positioned to reflect upon the body portion of said reflecting member heat radiated from said heating element, and means carried by said side frames for securing said reflecting member and said rear wall in spaced operative relation.

8. In an electric radiant heater, the combination of a pair of rigid supporting side frames, a reflecting member, a wall supported in the rear of said reflecting member and spaced therefrom, said reflecting member and said wall having portions at their lower side extending upwardly to an appreciable extent, said upwardly extending portion of said reflecting member being positioned to reflect upon the body portion of said reflecting member heat radiated from said heating element, said side frames being provided with projections at the inner faces thereof, and said reflecting member and said rear wall having their edge portions cooperative with said projections on said side frames, and means for holding said reflecting member and said rear wall in operative position with their side edges associated with said projections on said side frames.

9. In an electric radiant heater, the combination of a pair of spaced supporting side frames each having a body portion and a reduced and continuously upwardly curved extension therefrom, a reflecting member disposed in operative position between said side frames, said side frames having their forward edges provided with inwardly projecting flanges, and means carried by said side frames for supporting said reflecting member in operative position with portions of its side edges in engagement with said side frames beneath said flanges with a substantial part of the inner surface of said side frames exposed forwardly and upwardly of the lower portion of said reflecting member.

10. In an electric radiant heater, the combination of a pair of spaced and rigid supporting side frames each comprising a body portion and a relatively narrow upper extension therefrom, said extension being provided with inwardly projecting flanges at its forward and rear edges, a reflecting member disposed between said side frames, a wall disposed at the rear side of said reflecting member and spaced therefrom, and means for supporting said reflecting member and said rear wall in spaced operative relation with the side edges of portions of said reflecting member and said rear wall held within said inwardly projecting flanges on said side frames and with said parts constituting an upwardly extending and continuously curved air space of gradually decreasing area toward its open end.

11. In an electric radiant heater, the combination of a pair of spaced and rigid supporting side frames each comprising a body portion and a relatively narrow upper extension therefrom, said extension being provided with inwardly projecting flanges at its forward and rear edges, a reflecting member, a wall disposed at the rear side of said reflecting member and spaced therefrom, and means for supporting said reflecting member and said rear wall in spaced and operative relation with the side edges of portions of said reflecting member and said rear wall held within said inwardly projecting flanges on said side walls, terminals mounted on the body portions of said side frames at the inner face thereof, said terminals comprising yielding and resilient contact portions biased toward each other, and a self-sustaining electrical resistance heating element yieldably and detachably maintained in electrically and mechanically operative position by and between said terminals.

12. In an electric radiant heater, the combination of a pair of spaced supporting side frames, said side frames being provided with inwardly extending flanges at the forward edge of the upper portions of said side frames, a reflecting member mounted in operative position between said side frames with its side edges held in position beneath said flanges, an electrical resistance heating element disposed in operative position forwardly of said reflecting member, and means for mounting said heating element in operative position comprising terminals carried by and insulated from portions of said side frames below said inwardly projecting flanges.

13. In an electric radiant heater, the combination of a pair of spaced supporting side frames each comprising a body portion and a reduced upwardly projecting extension therefrom, a reflecting member, means associated with said side frames for supporting said reflecting member in operative position, an electrical resistance heating element mounted in operative position in front of said reflecting member, said reflecting member having a portion extending upwardly at its lower side in front of said heating element, and an open protecting grill movably mounted on the body portions of said side frames and disposed above said heating element when in operative position.

14. In an electric radiant heater, the combination of a pair of spaced supporting side frames, a reflecting member supported in operative position, a wall disposed at the rear of said reflecting member and spaced therefrom, said reflecting member and said wall having portions at its lower side extending forwardly and upwardly to an appreciable extent, an electrical resistance heating element mounted in operative position in front of said reflecting member, means for securing said reflecting member and said rear wall in spaced operative relation, said means being cooperative with said side frames, and a detachable open grill having its front edge supported at the upper edge of the forwardly projecting portions of said reflecting member and said rear wall and lying above said heating element as a protector therefor.

15. In an electric radiant heater, the combination of a pair of spaced supporting side frames each having a body portion and a reduced upwardly projecting extension therefrom, a reflecting member disposed in operative position between said side frames adjacent the forward edges of said reduced extensions, an electrical resistance heating element disposed in operative position in front of the lower portion of said reflecting member, terminal mounting means carried by the body portions of said side frames for yieldingly supporting said heating element, and means carried by said side frames for supporting said reflecting member in operative position with respect to said side frames.

16. In an electrical radiant heater, the combination of spaced supporting side frames, a reflecting member secured in operative position between said side frames, an elongated, self-sustaining resistance heating element disposed in position in front of said reflecting member and extending transversely of the planes of said side frames, and contact elements at least one of which includes a resilient portion mounted on said side frames and adapted to detachably and resiliently mount said heating element in mechanically and electrically operative position through pressure exerted in the direction of the longitudinal axis of said heating element.

In witness whereof I affix my signature hereto.

ARNOLD PFAU, Jr.